Patented Apr. 15, 1952

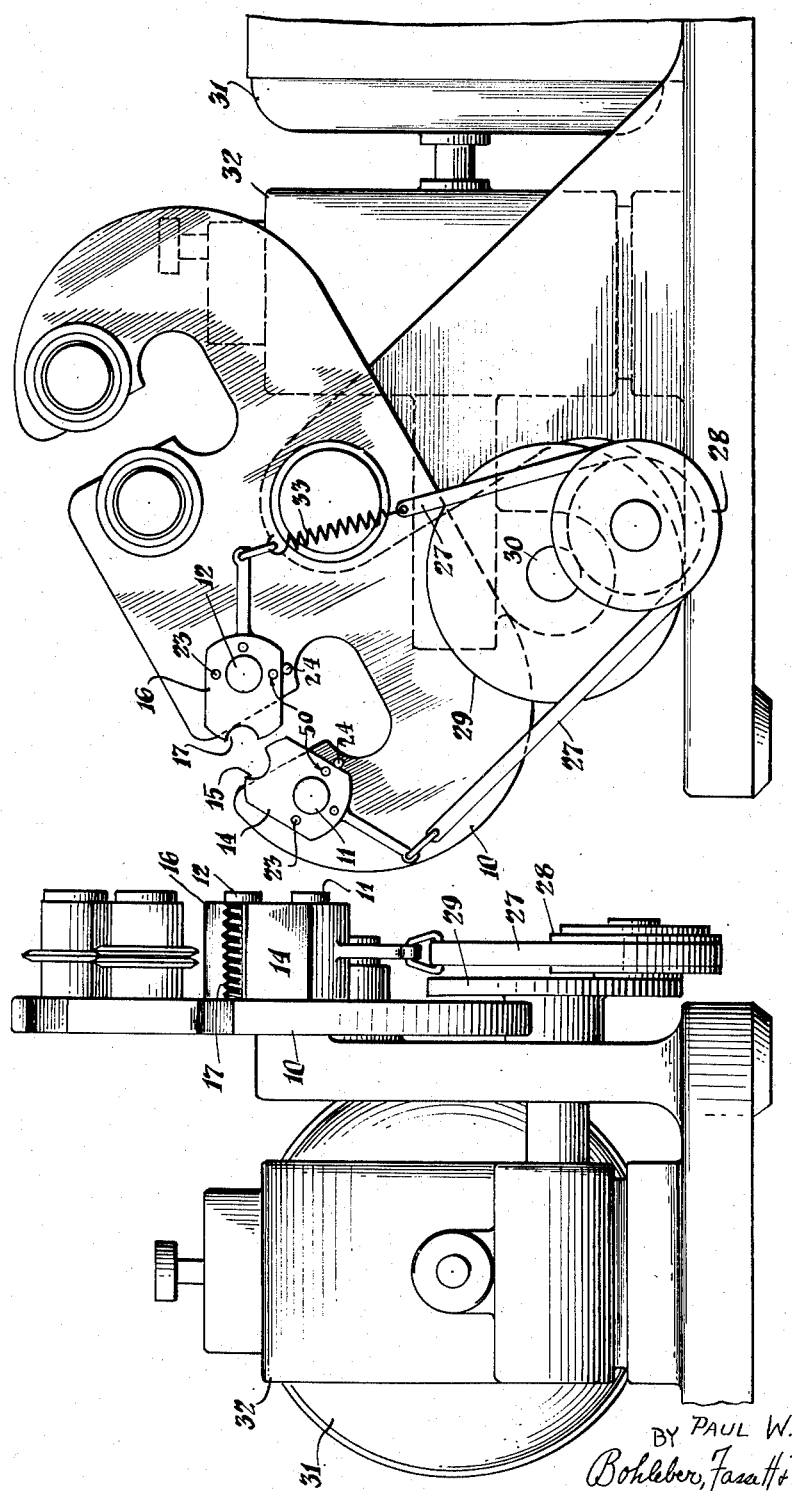

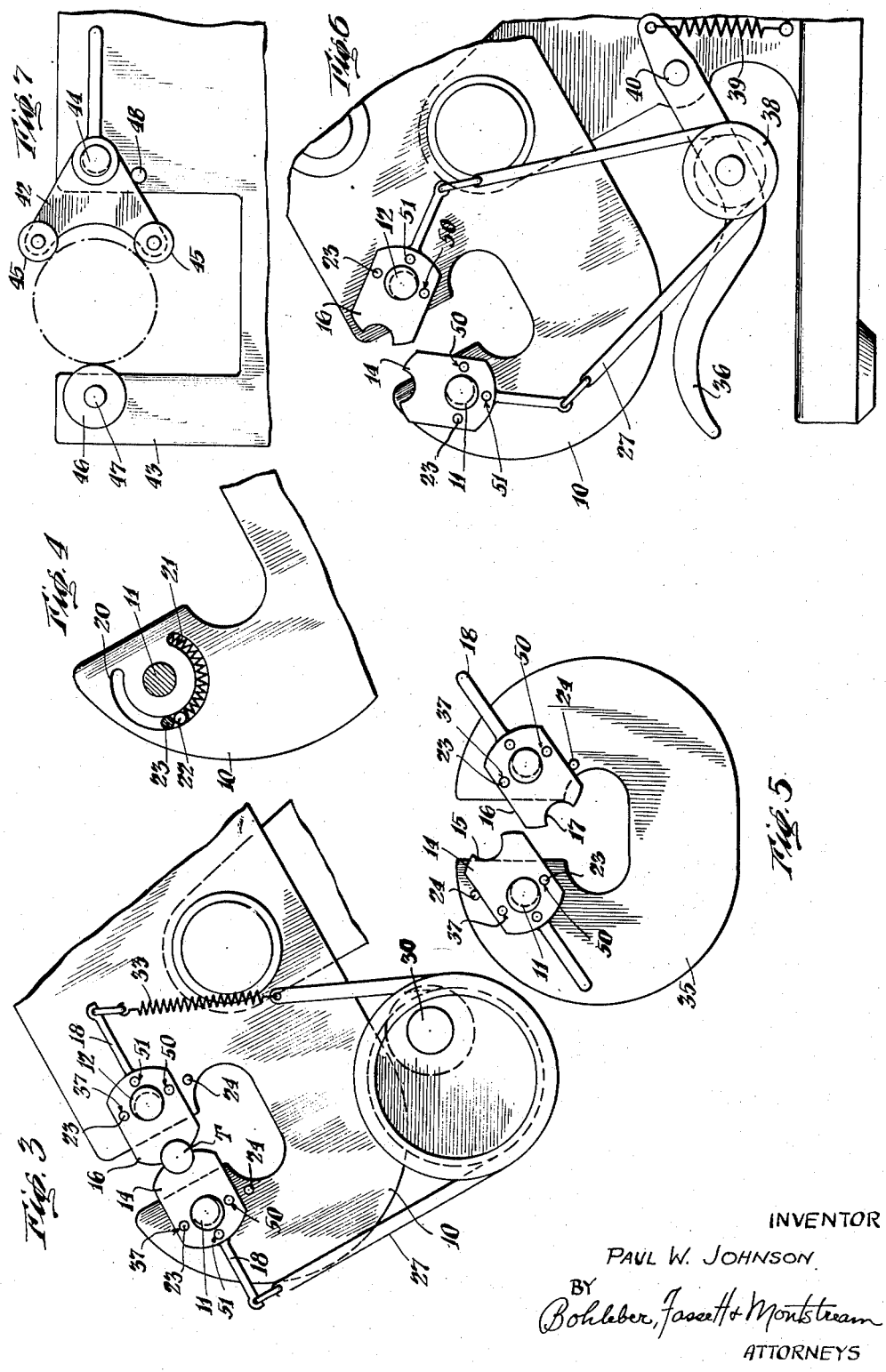

2,593,309

UNITED STATES PATENT OFFICE 2,593,309

SNAP-RING GAUGE HAVING PIVOTED JAWS

Paul W. Johnson, Bloomfield, Conn., assignor to The Johnson Gage Company, Bloomfield, Conn., a corporation of Connecticut Application March 8, 1946, Serial No. 652,870

11 Claims. (Cl. 33—178)

The invention relates to a gage which may be termed a snap ring type in that it resembles a ring gage because it gages a substantial length of the test part and a substantial portion of the circumference with one pass therethrough and is constructed upon the snap gage principle in that the test part is passed laterally therethrough. The gage includes, in its preferred form, pivoted gaging members having concave gaging portions to engage the part to be tested which gaging members are mounted upon spaced pivots so that the concave gaging portions swing outwardly or specifically upwardly to open position for receiving the part to be tested, and then swing downwardly in order to pass the test part to gaging position between the pivots. The gaging members may if desired pivot beyond gaging position so that the test part may pass through the gage to the exit or release side of the pivots.

The gage has particular applicability in gaging screw threads which are helical grooves or ridges although the gage is equally applicable to gage plain cylindrical parts or parts with circumferential grooves or ridges. In gaging relatively small parts, that is, parts having a diameter of less than one inch, and particularly in the very small sizes, it is difficult for different inspectors utilizing the same gage to inspect a test part with the same degree of accuracy. In other words, the inspection is based largely upon the feel of the test part passing between the gaging portions, and this feel will depend upon the individual inspector.

In order to render the inspection results uniform irrespective of the individual, the pivoted gaging members are manually pivoted upwardly in order to open the gage or gaging portions for insertion of a test part and a uniform pressure means is utilized to swing at least one of the gaging members in the reverse direction to bring the test part to or through gaging position by such uniform pressure means so that the human element is removed from the inspection operation.

It is an object of the invention to construct a gage of the snap ring type in which the gage member or members are moved to or through gaging position between their supporting means or pivots by uniform pressure means, that is, means other than the pressure exerted by the operator, so that the human element is eliminated from the gaging operation.

Another object of the invention is to construct a gage of the snap ring type utilizing novel spring means for impelling the pivoted gaging member or members in one direction.

Another object of the invention is to construct a gage which is operated in one direction by power or a motor so that the inspector merely feeds the test parts to the opening and closing gage and the pressure or force exerted to pass the test part through the gage is provided by uniform pressure means.

A still further object is to construct a gage which may be converted easily from a mere spring return gage to a uniform pressure gage in which the gaging operation itself is not performed by the inspector or vice versa, as desired.

Another object is to construct a uniform pressure gage of the snap ring type in which one gage member is self-opening and the other gage member is mounted for uniform pressure operation.

Other objects of the invention will be more apparent from the following description taken in connection with the accompanying drawings illustrating the invention in which:

Figure 1 is a side elevation of a gage with the pivoted gaging members in open position.

Fig. 2 is a front elevation of the gage.

Fig. 3 is a side elevation of the gage with the gaging members in gaging position.

Fig. 4 is a view of the gage with one of the gaging members removed and showing the spring means for propelling the gage member to or through gaging position by means which exerts substantially uniform pressure at gaging position.

Fig. 5 is a side elevation of a uniform pressure gage in which one gage member is mounted for return movement.

Fig. 6 illustrates a uniform pressure gage which is manually opened, the gage being shown with the handle depressed and the gage members in open position.

Fig. 7 illustrates an alternate form of a gage member having a gaging portion made up of a plurality of convex gaging rollers.

The gage in its preferred form includes a frame or frame member 10 having a pair of spaced supporting means which for pivoted gage members will be pivots 11 and 12. A gage member 14 is mounted upon the pivot 11 which gage member has a concave gaging portion 15 in the periphery thereof. The pivot 12 may carry a similar gage member 16 also having a concave gaging portion 17 for engaging a test part. The concave gaging portions would have screw threads upon the surface thereof to contact the threads upon a threaded test part such as a bolt or screw. One or both pivots 11 and 12 are adjustable in any suitable manner such as that shown in Patent 2,433,516 for adjusting the tolerance setting or spacing of the gage members.

In the preferred construction both of the gage members are pivoted and each gage member carries a concave gaging portion. It is to be understood, however, that one gage member may be of this form and the cooperating or complementary gage member may be of any other suitable or known form such as a roller. A gage of the latter form would not engage substantially the entire periphery of the test part, however, in certain situations it may have advantages.

Means are provided for exerting a uniform pressure at the gaging position. This means swings at least one gaging member in a direction to move the gaging portion from loading position to or through gaging position with a uniform pressure. This means may take any suitable form, that particularly illustrated utilizing a spring to propel each member having a concave gaging portion in a direction to move the gaging portions from open or loading position to gaging position or through gaging position. This spring has a definite tension at the point where the gaging portions are at or pass through gaging position between the pivots and such tension is dependent merely upon the tension or compression of the spring and upon the size of the spring used. The degree of pressure may be varied by changing the spring or otherwise varying the tension thereof. The pressure with which the test part passes to or through gaging position is entirely independent of the individual inspector so that a gage with a particular gage setting will function uniformly irrespective of who the operator or inspector may be.

The spring means particularly illustrated includes a curvilinear groove 20 in the face of one of the members including the frame member or the pivoted gage member and extends around the pivot for the latter. The groove is particularly illustrated as carried by the frame or frame member. A coil spring 21 is received within the groove and a ball contact 22 may be provided at one end of the spring for smoother operation. A contact pin 23 is carried by the other member which in the form illustrated with the groove in the frame, is carried by each pivoted gage member 14 and 16. The contact pin projects into the groove and contacts the spring or the ball 22 at the end thereof. A stop pin 24 may be carried by the frame for each gage member to limit the extent of movement thereof.

The gage may be opened by pressing or pulling downwardly on the handles 18 whereupon the pin 23 moves in the groove and compresses the spring 21 therein. The gaging members may be manually opened to the position shown in Figure 1. A test part is then inserted into the concave gaging portions 15 and 17 whereupon the part and the handles are released or particularly the handles so that the spring 21 pressing against the pin 23, swings each pivoted gaging member with its respective gaging portions downwardly to or through gaging position. Since it is the spring that propels each pivoted gaging member and the test part in the gaging movement and not the manual pressure of the operator, uniformity in gaging is secured.

The gage described is particularly suited to be a motor operated gage with which the inspector merely feeds the test parts to the gage. The handle or pivoted gage members instead of being manually manipulated, may be connected by a unidirectional connecting means such as a chain 27 or other flexible means to suitable mechanism for pulling the handles downwardly, that is, for swinging the concave gaging portions upwardly to open or inserting position. The means shown comprises a wheel or rim 28 around which the chain 27 passes, which wheel is eccentrically mounted upon the disc 29. The disc is carried by a shaft 30.

The shaft 30 is rotated preferably by a motor 31 having a change speed mechanism 32 so that the opening and closing of the gage may be obtained at any desired speed. Upon rotation of the shaft 30 and eccentric 28 by the motor, the latter moves downwardly and upwardly and pulls the handles 18 downwardly through the unidirectional connection or flexible chain 27. The spring 21 for each gaging member then swings or propels its respective gaging member in a direction to move the gaging portion thereof downwardly to gaging position between the pivots as illustrated in Figure 3, or the movement may continue through gaging position. The operator then merely feeds or inserts the test screws or parts into the gage as it opens to receive the same. The springs in propelling the gaging members and the test part through gaging position exert a substantially uniform pressure at gaging position which results in uniformity in the gaging operation. The gage can be made manually operable by disconnecting the flexible connection or chain 27.

The unidirectional connecting means or chain 27 preferably has a spring 33 forming a part of the chain. The spring serves a double function, namely, it keeps the chain taut so that the length of the chain need not be accurately determined and secondly in the opening of the gage the spring is stretched somewhat at the extreme limit of the movement of the eccentric. Upon the return movement then, the extension of the spring 33 contracts before the springs 21, operating upon each pivoted gage member, can function. There is, therefore, a short dwell of the gage members in open position during the contraction of the spring 33 to its original unexpanded position. This dwell in open position of the gage gives the operator a little more time to insert the test part within the gaging portions 15 and 17.

A manually operated gage is illustrated in Figure 6 which is essentially the same in construction as the gage illustrated in Figures 1 through 4. In the manual construction an operating lever 36 is carried upon a pivot 40 mounted in the frame. A roller 38 is carried by the operating lever around which the chain 27 extends. A spring 39 restores the lever to its up position. Upon pressing downwardly upon the lever 36 the cooperating gage members are swung to up or open position. Upon release of the operating lever by the operator, each spring 21 propels its respective gage member to or through gaging position. Like gage parts of Figure 1 are similarly numbered in Figure 6.

It is not essential that both gage members be propelled in a direction to pass the test part through the gage. This type of construction is illustrated in Figure 5 upon a hand gage having a frame 35 adapted to be held in the hand, in which the gage member 14 carries the pin 23 in a socket 50 upon the lower side of the pivot 11, so that the gage member is propelled to open position rather than closed position. The gage member 16, however, has its pin 23 in the socket 37 such that the spring 21 propels it downwardly in the gaging operation. The gaging member 16 is propelled by a heavier spring 21, since it is this spring which provides the uniform gaging pressure in propelling the test part and gage members to or through gaging position.

In operation of the gage illustrated in Figure 5, the operator may hold the gage in his hand, and with one finger engaging the handle 18 swing the gage member 16 to up or open position. With both gage members in open position, a test part is inserted into the gaging portions 15 and 17 whereupon the handle 18 is released by the operator. The stronger spring 21 for the gage member 16 propels the latter and the cooperating gage member 14 downwardly overcoming the weaker tension of the spring 21 for the gage member 14 which tends to propel the latter to open position, and the test part passes to or through gaging position under the pressure exerted by the heavier spring rotating gage member 16. With the test part released upon the exit side of the gage, the gage member 14 returns to its open position by the action of its return spring 21. For a second gaging operation, the operator presses the handle 18 downwardly to again swing the gage member 16 to open position. Uniform gaging pressure is obtained from the differential pressure between the strong spring 21 for the gage member 16 propelling both gage members 14 and 16 downwardly and the weaker opening spring 21 for the gage member 14. It will be seen, therefore, that the gage of Figure 5 requires manipulation of one gage member only, in order to gage a test part, which simplifies the gaging operation particularly when the gage is to be held in the hand of the inspector.

Figure 7 illustrates a gage having a concave gage member 42 which is pivoted to the frame 43 upon a pivot 44. The concave gaging portion is formed by a plurality of convex rollers 45, two being illustrated, for engaging a plurality of points around the circumference of the test part P. Additional rollers would gage additional points around the circumference of the test part. The complementary gage member may be a second gage member 42 or a roller 46 mounted upon a pivot pin 47. The pivoted gaging member is propelled to or may be propelled through gaging position by spring means as illustrated in Figure 4. It may be motor driven also if desired. This gage also illustrates a form which, when provided with a stop 48, does not pivot through gaging position since the stop 48 is engaged by the pivoted gage member at gaging position. The test part is removed by a return upward movement.

The gages may be constructed so that they may be converted from a uniform pressure gage to a spring or self-opening gage by withdrawing the pin 23 for each gage member and positioning it in the socket 50 in which position the end of the pin is at the other end of the groove 20 and spring. This repositioning reverses the action of the spring so that it propels the gage member towards open position rather than in the opposite direction or towards exit position. The pin may be inserted in the hole or socket 51 if desired and may engage either end of the spring 21 depending upon the direction in which it is desired to have the spring propel the gaging member.

The gage illustrated is designed so that the gage members swing the gaging portions from open position downwardly through gaging position between the supporting or pivot means to exit position. It is to be understood, however, that the gage members need not swing or pivot the gaging portions beyond gaging position as illustrated in Figure 7, which is the position they assume when they are in alignment with a line drawn through the center of the pivots. In this position the gaging portions are closest together and hence in gaging position. Also each of the gages illustrated may be motor operated by the motor drive shown in the construction of Figures 1 to 4.

The invention is presented to fill a need for improvements in a gage. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage comprising a frame, a pair of complementary gage members at least one having a gaging portion for engaging a plurality of points around the circumference of a test part, means supporting each gage member at spaced points including pivot means for each gaging member having a gaging portion for engaging a plurality of points around the circumference of a test part so that each gaging portion swings upwardly and away from the other gaging member to open the same for insertion of a test part to be gaged and pivots downwardly and towards the other gage member at least to gaging position between the supporting means, means propelling the gage members upon their respective pivot means in a downward gaging direction for the gaging portions with a substantially uniform pressure at gaging position, and unidirectional operating means to periodically swing each pivoted gage member in the other direction to open position against the action of the propelling means.

2. A gage comprising a frame, a pair of complementary gage members at least one having a gaging portion for engaging a plurality of points around the circumference of a test part, means supporting each gage member at spaced points including pivot means for each gaging member having a gaging portion for engaging a plurality of points around the circumference of a test part so that each gaging portion swings upwardly and away from the other gaging member to open the same for insertion of a test part to be gaged and pivots downwardly and towards the other gage member at least to gaging position between the supporting means, means propelling the gage members upon their respective pivot means in a downward gaging direction for the gaging portions with a substantially uniform pressure at gaging position, and motor means to periodically swing each pivoted gage member in the other direction to open position against the action of the propelling means, including a unidirectional pull connection with each pivoted gage member, means to pull the connection in one direction, and a motor to operate the pull means.

3. A gage comprising a frame, a pair of complementary gage members at least one having a gaging portion for engaging a plurality of points around the circumference of a test part, means supporting each gage member at spaced points including pivot means for each gaging member having a gaging portion for engaging a plurality of points around the circumference of a test part so that each gaging portion swings upwardly and away from the other gaging member to open the same for insertion of a test part to be gaged and pivots downwardly and towards the other gage member at least to gaging position between the supporting means, means propelling the gage members upon their respective pivot means in a downward gaging direction for the gaging portions with a substantially uniform pressure at gaging position, and motor means to periodically swing each pivoted gage member in the other direction to open position against the action of the propelling means, including a flexible chain connected with each pivoted gaging member, an eccentric operatively connected with the chain, and a motor to rotate the eccentric.

4. A gage comprising a frame, a pair of complementary gage members each having a gaging portion for engaging a plurality of points around the circumference of a test part, means supporting each gage member at spaced points including pivot means for each gaging member so that each gaging portion swings upwardly and away from the other gaging portion to open the same for insertion of a test part to be gaged and pivots downwardly and towards each other at least to gaging position between the pivot means, means propelling the gage members upon their respective pivot means in a downward gaging direction for the gaging portions with a substantially uniform pressure at gaging position, and unidirectional operating means to swing both pivoted gage members in the other direction to open position against the action of the propelling means.

5. A gage comprising a frame, a pair of complementary gage members each having a gaging portion for engaging a plurality of points around the circumference of a test part, pivot means swingably supporting each gage member at spaced points so that each gaging portion swings upwardly and away from the other gaging portion to open the same for insertion of a test part to be gaged and pivots downwardly and towards the other gaging portion at least to gaging position between the pivot means, means propelling the gage members upon their respective pivot means in a downward gaging direction for the gaging portions with a substantially uniform pressure at gaging position, a flexible means having two ends connected at one end with one pivoted gage member and at the other end with the other gage member to swing the same in the other direction to open position against the action of the propelling means, and operating means engaging the flexible means between the ends thereof to pull both gaging members to open position.

6. A gage comprising a frame member, a pair of complementary gage members mounted upon the frame, at least one having a gaging portion for engaging a plurality of points around the circumference of a test part, means supporting each gage member at spaced points including pivot means for each gaging member having a gaging portion for engaging a plurality of points around the circumference of a test part so that each gaging portion swings upwardly and away from the other gage member to open the same for insertion of a test part to be gaged and pivots downwardly and towards the other at least to gaging position between the supporting means, and means to propel the gage members in one direction including a curvilinear groove in one of the members, a coil spring received in the groove, and a pin carried by the other member and extending into the groove and engaging the spring.

7. A gage comprising a frame member, a pair of complementary gage members mounted upon the frame at least one having a gaging portion for engaging a plurality of points around the circumference of a test part, means supporting each gage member at spaced points including pivot means for each gaging member having a gaging portion for engaging a plurality of points around the circumference of a test part so that each gaging portion swings upwardly and away from the other gage member to open the same for insertion of a test part to be gaged and pivots downwardly and towards the other at least to gaging position between the supporting means, and means to propel each pivoted gage member in a downward or gaging direction with a substantially uniform pressure including a curvilinear groove in one of the members, a coil spring received in the groove, and a pin carried by the other member and extending into the groove and engaging the spring.

8. A gage comprising a frame, a pair of complementary gage members, at least one having a gaging portion for engaging a plurality of points around the circumference of a test part, means supporting each gage member at spaced points including pivot means for each gaging member having a gaging portion for engaging a plurality of points around the circumference of a test part so that each gaging portion swings upwardly and away from the other gage member to open the same for insertion of a test part to be gaged and pivots downwardly and towards the other at least to gaging position between the supporting means, and means to propel each pivoted gage member in a downward or gaging direction with a substantially uniform pressure including a curvilinear groove in the frame, a coil spring received in the groove, and a pin carried by the pivoted gage member extending into the groove and engaging the spring.

9. A gage comprising a frame member, a pair of complementary gage members at least one having a gaging portion for engaging a plurality of points around the circumference of a test part, means supporting each gage member at spaced points including pivot means for each gaging member having a gaging portion for engaging a plurality of points around the circumference of a test part so that each gaging portion swings upwardly and away from the other gage member to open the same for insertion of a test part to be gaged and pivots downwardly and towards the other at least to gaging position between the supporting means, means to propel the gage member including a curvilinear groove in one of the members, a coil spring received in the groove, and the other member having a plurality of sockets, and a pin carried in one of the sockets and extending into the groove and engaging the spring.

10. A gage comprising a frame, a pair of complementary gage members at least one having a gaging portion for engaging a plurality of points around the circumference of a test part, means supporting each gage member at spaced points including pivot means for each gaging member having a gaging portion for engaging a plurality of points around the circumference of a test part so that each gaging portion swings upwardly and away from the other gaging member to open the same for insertion of a test part to be gaged and pivots downwardly and towards the other gage member at least to gaging position between the supporting means, means propelling at least one pivoted gage member upon its respective pivot means in downward gaging direction for the gaging portions with a substantially uniform pressure at gaging position, and motor means to periodically swing each downwardly propelled pivoted gage member in the other direction to open position against the action of the propelling means, including a unidirectional pull connection with each pivoted gage member, a spring forming at least a part of the pull connection, means to pull the connection in one direction, and a motor to operate the pull means.

11. A gage comprising a frame, a pair of complementary gage members each having a gaging portion for engaging a plurality of points around the circumference of a test part, means supporting each gage member at spaced points including pivot means so that each gaging portion swings upwardly and away from the other gaging member to open the same for insertion of a test part to be gaged and pivots downwardly and towards the other gage member at least to gaging position between the supporting means, means propelling each gage member upon its respective pivot means in downward gaging direction for the gaging portions with a substantially uniform pressure at gaging position, and motor means to periodically swing each pivoted gage member in the other direction to open position against the action of the propelling means, including a unidirectional pull connection with each pivoted gage member, a coil spring forming at least a part of the pull connection, means to pull the connection in one direction, and a motor to operate the pull means.

PAUL W. JOHNSON.

REFERENCES CITED

The following references are of record in the file of this patent:

UNITED STATES PATENTS

| Number | Name | Date |
| --- | --- | --- |
| 341,714 | Albert | May 11, 1886 |
| 1,098,760 | Reed | June 2, 1914 |
| 1,225,858 | Raule | May 15, 1917 |
| 1,261,451 | Smith | Apr. 2, 1918 |
| 1,461,083 | Damerell | July 10, 1923 |
| 1,925,082 | Dodd | Sept. 5, 1933 |
| 1,938,216 | Damerell | Dec. 5, 1933 |
| 1,949,767 | Thompson | Mar. 6, 1934 |
| 2,321,121 | Basquin | June 8, 1943 |
| 2,322,954 | Pembroke | June 29, 1943 |
| 2,325,423 | Pembroke | July 27, 1943 |
| 2,327,629 | Fedorchak | Aug. 24, 1943 |
| 2,332,010 | Pike | Oct. 19, 1943 |
| 2,372,879 | Bjorklund et al. | Apr. 3, 1945 |
| 2,409,280 | Hohwart | Oct. 15, 1946 |
| 2,419,263 | Hohwart | Apr. 22, 1947 |
| 2,433,516 | Johnson | Dec. 30, 1947 |

FOREIGN PATENTS

| Number | Country | Date |
| --- | --- | --- |
| 102,573 | Great Britain | Dec. 14, 1916 |
| 124,001 | Great Britain | Mar. 20, 1919 |